(12) United States Patent
Lübbers

(10) Patent No.: US 6,446,557 B1
(45) Date of Patent: Sep. 10, 2002

(54) IGNITION UNIT FOR A PASSENGER PROTECTION DEVICE OF A MOTOR VEHICLE

(75) Inventor: Willi Lübbers, Kuddewörde (DE)

(73) Assignee: Nico-Pyrotechnik Hanns-Juergen Diedrichs GmbH & Co. KG, Trittau (DE)

(*) Notice: Subject to any disclaimer, the term of this patent is extended or adjusted under 35 U.S.C. 154(b) by 0 days.

(21) Appl. No.: 09/463,611

(22) PCT Filed: Jul. 14, 1998

(86) PCT No.: PCT/DE98/01968

§ 371 (c)(1),
(2), (4) Date: Mar. 13, 2000

(87) PCT Pub. No.: WO99/06786

PCT Pub. Date: Feb. 11, 1999

(30) Foreign Application Priority Data

Aug. 1, 1997 (DE) .......................................... 197 33 353

(51) Int. Cl.[7] .............................................. F42C 19/12
(52) U.S. Cl. ................................ 102/202.9; 102/205.5; 102/202.7; 102/202.8
(58) Field of Search .......................... 102/202.1, 202.2, 102/202.3, 202.4, 202.5, 202.6, 202.7, 202.8, 202.9, 202.11–202.14

(56) References Cited

U.S. PATENT DOCUMENTS

| 4,306,499 | A | * | 12/1981 | Holmes |
| 4,493,006 | A | * | 1/1985 | Lange et al. |
| 5,345,872 | A | * | 9/1994 | Takahashi et al. |
| 5,503,077 | A | * | 4/1996 | Motley |
| 5,556,132 | A | * | 9/1996 | Sampson |
| 5,558,366 | A | * | 9/1996 | Fogle, Jr. et al. |
| 5,596,163 | A | * | 1/1997 | Caflisch et al. |
| 5,613,706 | A | * | 3/1997 | Parker et al. |
| 5,616,881 | A | * | 4/1997 | Hansen |
| 5,621,183 | A | * | 4/1997 | Bailey et al. |
| 5,647,924 | A | * | 7/1997 | Avory et al. |
| 5,648,634 | A | | 7/1997 | Avory et al. ............. 102/202.1 |
| 5,672,841 | A | * | 9/1997 | Monk et al. |
| 5,695,215 | A | * | 12/1997 | Headley et al. |
| 5,728,964 | A | * | 3/1998 | Avory et al. |
| 5,732,634 | A | * | 3/1998 | Flickinger et al. |
| 5,929,367 | A | * | 7/1999 | Neff et al. |
| 5,932,832 | A | * | 8/1999 | Hansen et al. |
| 5,988,069 | A | * | 11/1999 | Bailey |

FOREIGN PATENT DOCUMENTS

| DE | 4102275 | 6/1992 |
| DE | 4429175 | 3/1995 |
| EP | 0029671 | 6/1981 |
| EP | 0658739 | 6/1995 |
| FR | 70.15636 | 12/1971 |
| WO | WO9511421 | 4/1995 |

* cited by examiner

Primary Examiner—Charles T. Jordan
Assistant Examiner—Troy Chambers
(74) Attorney, Agent, or Firm—Milde & Hoffberg, LLP

(57) ABSTRACT

The actuation device has nail-shaped contact pins (1), the heads (3) of which project into an ignition chamber (8), with the ends of a resistor wire (6) being attached to the heads (3) of the contact pins (1). The detonator (9) which fills the ignition chamber (8) is a detonator which is free-flowing during the manufacture of the device, which envelopes the heads (3) of the contact pins (1) and the resistor wire (6) and which subsequently solidifies. The contact pins are surrounded by an electrically conductive extension (23) of the housing of the actuation device, so that a spark gap (F) is formed here; to discharge overvoltage, several sparks can flash over this gap simultaneously.

10 Claims, 1 Drawing Sheet

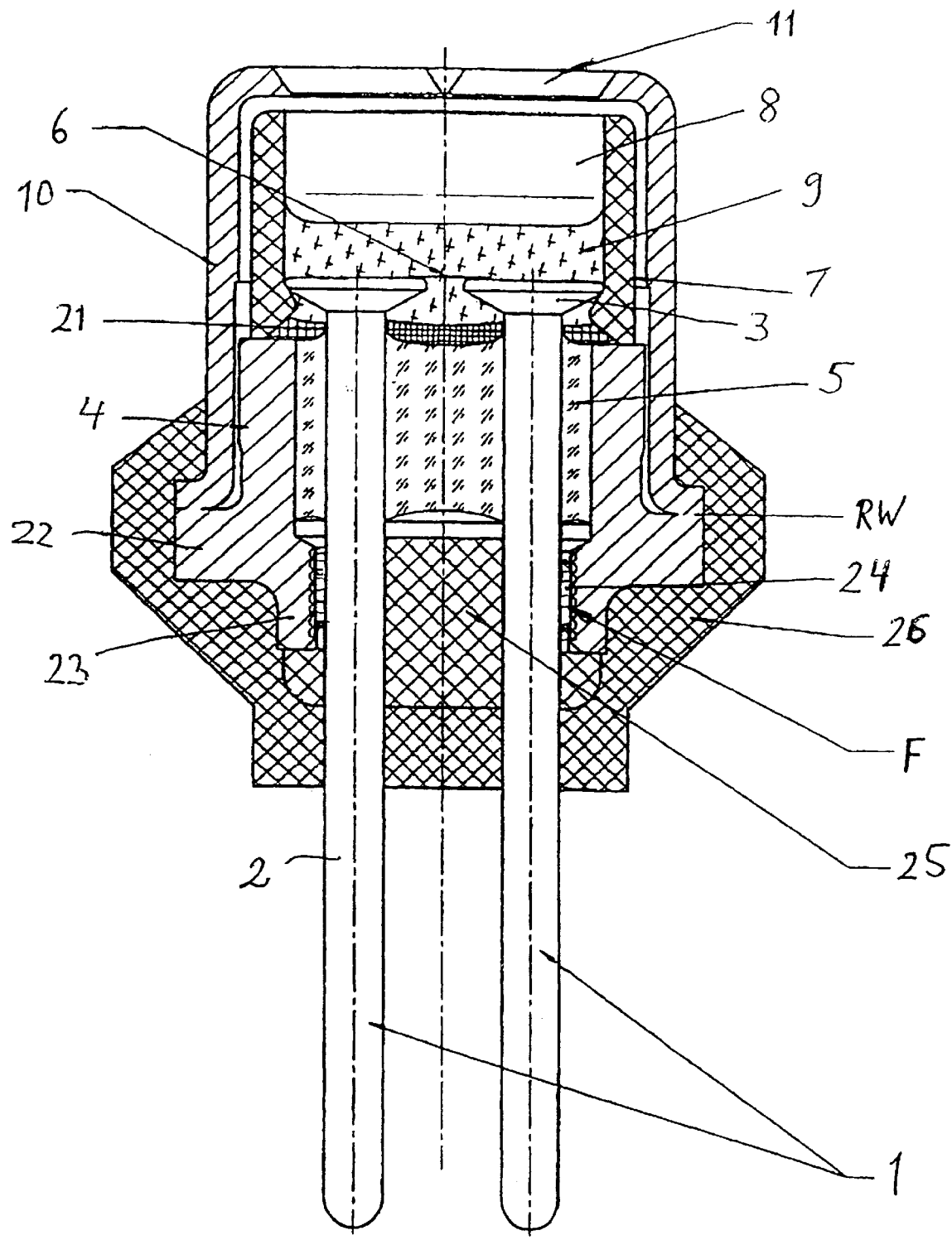

IGNITION UNIT FOR A PASSENGER PROTECTION DEVICE OF A MOTOR VEHICLE

BACKGROUND OF THE INVENTION

The invention relates to an actuation device for a passenger protection device in a motor vehicle, in particular for an inflatable impact protection cushion (airbag).

Actuation devices for passenger protection devices in a motor vehicle, e.g. belt tensioner or airbag systems, are known from the German Patent No. DE 4102275 C1. As an actuation element, such actuation devices have a low-value resistor wire in an ignition chamber, as well as a detonator which is ignited in the event of a sufficient temperature rise or when the resistor wire melts.

The German published Patent Application No. DE 4429175 A1 discloses an actuation device with a housing made of a metal alloy and with an adapter ring which is inserted in the housing and in which a glass insulator is located. Contact pins, whose ends project into the ignition chamber and meet the front side of the insulator and are connected to a welded-on resistor wire which functions as an actuation element, are sealed into this insulator.

In the known actuation device, the ends of the contact pins sealed into the electrically insulating glass must first be surface-ground with the front side of the glass block so that the resistor wire is positioned cleanly on the glass. Otherwise damage to the welded-on resistor wire cannot be avoided due to the pressure of the priming layers of solid pyrotechnical material which is filled into the ignition chamber under high pressure.

Furthermore, this design has the disadvantage that the detonator may become detached from the glass body in the event of shaking movements, knocks or temperature fluctuations through the forces that can then occur, so that contact to the resistor wire deteriorates or is even interrupted. In such a case, the detonator can no longer be ignited reliably.

Furthermore, depending on the defined value of the actuation signal of the actuating and monitoring electronics, a suitable resistance value must be used for the resistor wire, which in turn results in a differing length of the resistor wire and thus in a differing distance between the two contact pins within the ignition chamber. Consequently the contact pins, which are usually at a distance from each other permanently defined by the plug of the monitoring electronics, must be bent to different degrees in order to guarantee this necessary gap in the housing.

From International Patent Publication No. WO 95/11421, an actuation device is known which in principle is designed in a similar way to the above-mentioned device in accordance with DE 44 29 175 A1 and which is assumed to be the latest state of technology as formulated in patent claim 1. Here two nail-shaped contact pins are inserted in an electrically insulating plastic or rubber material, with the flat heads of the contact pins being in contact with the upper side of the plastic material. The resistor wire is intended to be positioned between the heads; the primary detonator is mounted on this wire, and this detonator is in turn in contact with the remaining detonator in the ignition chamber.

In practice, such an actuation device is not reliable in use, since in particular the sealing problems between the plastic material and the nail heads are considerable. Moreover, here there is the problem that shaking movements, knocks or temperature fluctuations acting on the actuation device can cause the resistor wire and the detonator to lose contact with each other, so that reliable actuation is no longer guaranteed.

A further problem in such actuation devices is overvoltage, which can lead to incorrect actuation. For this reason, this overvoltage must be discharged, and for this purpose a specified spark gap is generally created as an overvoltage arrester. The specified spark gap is the shortest distance between two parts with differing conductivity within the actuation device.

In the actuation device in accordance with the above-mentioned DE 4429175 Al, a spark gap is formed by a conductive ring provided for this purpose, which leaves a gap free to the contact pins that transmit the signals of the actuating and monitoring electronics. Any sparks are thus transmitted from the housing to the contact pins and not to the actuating wire.

It has turned out, however, that in the event of overvoltage of only several kilovolts (kV) this overvoltage cannot be discharged via the spark gap, so that the resistor wire of the actuation device melts and the actuation device is triggered.

Moreover, the installation of the conductive ring or equivalent elements to form a spark gap requires further sealing measures and expensive manufacturing operations, while at the same time enlarging the overall dimensions of the device.

SUMMARY OF THE INVENTION

A principal object of the present invention is therefore to create an actuation device for a passenger protection device in a motor vehicle whose production is simple and less elaborate, and in particular does not require the operation of surface-grinding the contact pins.

The invention is also based on the task of creating an actuation device which can be adapted easily, without involving additional work and expense, to the values defined by the manufacturers of the monitoring electronics.

A further objective of the present invention is to equip the actuation device with an integrated overvoltage arrester requiring no additional elements or manufacturing operations.

In accordance with the invention, these tasks are achieved by providing contact pins which are shaped like nails, having one neck and one head each. The heads of the contact pins are caused to project into the ignition chamber and the resistor wire is connected between the heads of the two pins. Finally, the detonator, which is free-flowing during the manufacture of the device, surrounds the heads of the contact pins and the resistor wire and subsequently solidifies.

In accordance with the invention, the cost of producing the actuation device is reduced through the use of nail-shaped contact pins projecting into the ignition chamber, on the heads of which a resistor wire of the required length is attached, preferably welded on. In order to be able to guarantee the stability and durability of the device, the housing is filled with a detonator which is initially fluid and surrounds the heads of the contact pins and the resistor wire, and subsequently solidifies. Such detonators are known: The German patent No. DE 4319919 C1 describes detonators and explosives which are free-flowing during manufacture and which thereafter solidify.

As a result of these measures, isotropic pressure acts on the wire, thus ruling out the possibility of any damage caused by pressure. Furthermore, the detonator is anchored to the heads of the contact pins, so that even in the event of expansion and stretching of the detonator due to temperature fluctuations, vibrations in the actuation devices or knocks on them cannot detach the detonator; this guarantees that actuation is always reliably effected. Temperature tests in which the actuation device was exposed to temperature fluctuations between +110° C. and −40° C., as well as vibration tests, have confirmed this.

Surface-grinding of the contact pins with the insulator is not necessary either, which simplifies the manufacture of the actuation device significantly.

Pyrotechnical mixtures with a binder, which are initially fluid and subsequently solidify, are preferred.

In the design in accordance with invention, it is not necessary to attach the ends of the resistor wire to the edges of the pin heads, since, as experiments have shown, the resistance surprisingly depends essentially only on the length of the wire between the points of attachment, so that the wire can be attached to any point on the upper side of the head of the nail. This fact results in a simple adaptation of the resistance value of the resistor wire to the values of the actuation signals defined by the manufacturers of the actuating and monitoring electronics by varying the length of the resistor wire and thus the position of the points of attachment on the heads of the pins. This means that it is not necessary to vary the gap between the contact pins in the ignition chamber, e.g. by bending the contact pins to different angles. On the contrary, these can be straight and have a constant distance from one another. The diameters of the heads of the contact pins are dimensioned in such a way that the entire value range for the resistance of the resistor wire is covered for monitoring electronics supplied by various manufacturers.

Furthermore, in accordance with the invention, instead of the almost point-shaped spark gaps known so far, a relatively large-surfaced or linear spark gap is provided as an overvoltage arrester. It has turned out that in the event of higher overvoltage values, several sparks can also flash over at the same time, and the overvoltage is discharged reliably without the actuation device being triggered. On the basis of the geometry and arrangement of the elements of the actuation device, an additional element does not have to be installed for this purpose. In accordance with the invention, the spark gap is preferably achieved by surrounding the contact pins with an electrically conductive extension of the housing, spanning a considerable length of the necks of the contact pins. This length is selected so that it is, for example, approximately comparable with the circumference of the contact pins. The internal wall of the extension is preferably roughened, for example it is equipped with a thread. It has turned out that when overvoltage occurs, this design also allows several sparks to flash over simultaneously.

As explained above, the bending of the contact pins and the surface-grinding of the pins with the insulation glass is avoided through the present invention. The result is a considerable reduction in the manufacturing effort and manufacturing costs involved, and simple universal adaptability to the requirements of the respective manufacturers of the actuating and monitoring electronics. A further reduction in the cost and effort involved in manufacturing is effected by the geometry-specific integrated overvoltage arrester in accordance with the invention.

The design in accordance with the invention complies with the requirements of the function guarantee for at least ten years, and is gas-tight and in particular, helium-tight.

In the following, the invention shall be explained in greater detail on the basis of an embodiment with reference being made to the accompanying drawing, in which a sectional view of an actuation device with an integrated overvoltage arrester in accordance with the present invention is shown.

BRIEF DESCRIPTION OF THE DRAWING

The FIGURE is a cross-sectional view of an actuation device for a motor vehicle passenger protection device, such as an airbag, according to the preferred embodiment of the present invention.

DESCRIPTION OF THE PREFERRED EMBODIMENT

The preferred embodiment of the present invention will now be described with reference to the single FIGURE of the drawing.

In accordance with the FIGURE, nail-shaped contact pins 1, which have a neck 2 and a head 3, are sealed in an adapter ring 4 into an insulating glass material 5 and are permanently secured at a defined distance from each other. The heads 3 of the contact pins 1 project out of the adapter ring 4. A resistor wire 6 is welded onto the heads 3 of the contact pins 1. A set sleeve 7 is placed on the adapter ring 4. This sleeve 7 is connected to the adapter ring 4. The resulting volume forms an ignition chamber 8.

A sealant 21 is applied to the base of the ignition chamber 8. The ignition chamber is then filled with a free-flowing detonator 9, which subsequently solidifies. Then a metal cap 10 is placed on top; on its top side this has a burst surface 11 and its edge is connected on the opposite side to a radial flange 22 of the adapter ring 4 by means of resistance welding RW.

There has thus been shown and described a novel actuation device for a passenger protection device in a motor vehicle which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

On the side of the adapter ring 4 facing away from the heads 3 of the contact pins 1, the ring has a cylindrical extension 23, which surrounds the contact pins 1 over a relatively long distance. Between the internal wall of the extension 23 and the contact pins 1, a spark gap F is formed. The radial distance between the extension 23 and each of the contact pins 1 is smaller than the distance between the heads 3 of the contact pins 1 and the metal cap 10. This means that in the event of overvoltage, any sparks flash over from the housing 4, 10 to the contact pins 1 and not to the heads 3. In the event of overvoltage, the sparks can flash across over the entire circumference of the contact pins. The axial length of the extension 23 is selected in such a way that in the event of high overvoltage levels, several sparks can flash over simultaneously.

The radial width of the spark gap F is preferably 0.3 mm, but can be given any suitable value between 0.1 mm and 0.9 mm.

The internal edge of the extension facing the contact pins can also be roughened, for example it can be in the form of a thread 24, in order to facilitate sparkover.

The extension 23 is closed with a stopper 25 made of electrically insulating material, with the spark gap F remaining free. The stopper 25, the contact pins 1 and the edge of the cap 10 facing away from the ignition chamber 8 are encased in a plastic jacket 26, as known from the latest state of technology.

The effective resistance of the resistor wire 6 is surprisingly only a function of the distances between the welds on the ends of the wire. This fact makes it possible to provide a resistance value adapted to the actuation signal of the monitoring electronics by varying the distance between the welds while maintaining a constant distance between the contact pins.

What is claimed is:

1. In an actuation device for a passenger protection device in a motor vehicle, comprising two nail-shaped contact pins, each having a head and a neck extending away from the head, which are fitted into an adapter ring filled with electrically insulating material, a cap-shaped housing placed on top of the adapter ring, forming an ignition chamber between the adapter ring and the housing and a resistor wire electronically connected between the heads of the contact pins located in the ignition chamber, the ignition chamber being filled with a detonator, the improvement wherein a portion of the necks of the contact pins are sealed in a glass material surrounded by the adapter ring, and wherein the heads of the contact pins project into the ignition chamber and together with the resistor wire are completely surrounded by a detonator which is free-flowing during the manufacture of the actuation device and which subsequently solidifies, causing the detonator to be anchored on the heads of the contact pins.

2. Actuation device in accordance with claim 1, wherein the resistor wire is welded onto a top side of the heads of the contact pins.

3. Actuation device in accordance with claim 1, wherein the necks of the contact pins are straight.

4. Actuation device in accordance with claim 1, wherein the housing has a bushing and a cap which surrounds the bushing and is connected to the adapter ring, with the cap having a burst surface, and wherein the ignition chamber is mainly limited by the bushing and the burst surface.

5. Actuation device in accordance with claim 1, wherein the housing and the adapter ring are made of metal.

6. Actuation device in accordance with claim 1, further comprising a stopper made of electrically insulating material surrounding a portion of the necks of the contact pins which extend outward away from the ignition chamber, with the connection ends of the contact pins being left free.

7. In an actuation device for a passenger protection device in a motor vehicle, comprising two contact pins, each having a head and a neck extending away from the head, which are cast into an adapter ring filled with electrically insulating material, a cap-shaped housing placed on top of the adapter ring, forming an ignition chamber between the adapter ring and the housing, and a resistor wire electronically connected between the heads of the contact pins located in the ignition chamber, the improvement wherein the adapter ring is made of metal and has an extension which surrounds a portion of the necks of the contact pins in such a way as to form a spark gap (F) between the internal wall of the extension and the contact pins, with the spark gap having a dimension that is smaller than the otherwise smallest distance between the electrically conductive housing and the contact pins, and wherein the internal wall of the extension is roughened with a thread.

8. Actuation device in accordance with claim 7, wherein the spark gap has a radial width of between 0.1 mm and 0.9 mm.

9. Actuation device in accordance with claim 7, wherein the extension is closed with an electrically insulating stopper which leaves the spark gap (F) free.

10. Actuation device in accordance with claim 8, wherein the spark gap has a radial width of approximately 0.3 mm.

* * * * *